United States Patent
De Vries

(10) Patent No.: US 6,419,727 B1
(45) Date of Patent: *Jul. 16, 2002

(54) PROCESS FOR THE REMOVAL OF CONTAMINANTS FROM A GAS, USING A GAS CLEANING AGENT

(75) Inventor: Cornelis De Vries, Amsterdam (NL)

(73) Assignee: Gemeente Amsterdam, Gemeentelijke, Amsterdam (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,654

(22) PCT Filed: Mar. 17, 1998

(86) PCT No.: PCT/NL98/00153

§ 371 (c)(1), (2), (4) Date: Oct. 28, 1999

(87) PCT Pub. No.: WO98/41310

PCT Pub. Date: Sep. 24, 1998

(30) Foreign Application Priority Data

Mar. 20, 1997 (NL) .............................................. 1005578

(51) Int. Cl.$^7$ .......................... B01D 53/14; B01D 53/70

(52) U.S. Cl. .............................. 95/155; 95/237; 95/239; 95/240

(58) Field of Search .......................... 95/155, 187, 237, 95/239, 240

(56) References Cited

U.S. PATENT DOCUMENTS

| | | | | |
|---|---|---|---|---|
| 2,169,369 A | * | 8/1939 | Osterloh et al. | 95/155 X |
| 2,373,951 A | * | 4/1945 | Evans et al. | 95/155 |
| 2,928,498 A | * | 3/1960 | Schmid-Nisoli et al. | 95/237 |
| 4,426,210 A | * | 1/1984 | Drawert et al. | 95/240 X |

FOREIGN PATENT DOCUMENTS

| | | | | |
|---|---|---|---|---|
| DE | 39 39 214 | | 6/1991 | .......... B01D/53/34 |
| DE | 42 44 513 | | 7/1994 | .......... B01D/53/34 |
| EP | 0 442 079 | | 8/1991 | .......... B01D/53/00 |
| SU | 0986470 A | * | 1/1983 | .................. 95/237 |

* cited by examiner

*Primary Examiner*—Robert H. Spitzer
(74) *Attorney, Agent, or Firm*—Darby & Darby

(57) ABSTRACT

A process for the removal of contaminants from a gas, using a gas cleaning agent, which contamination is selected from the group comprising aromatic hydrocarbons and (poly) halogenated aromatic hydrocarbons. For the removal of the contaminant a detergent is added as gas cleaning agent. The detergent is selected from a group formed by an anionic detergent, non-ionic detergent and a mixture thereof.

6 Claims, No Drawings

PROCESS FOR THE REMOVAL OF CONTAMINANTS FROM A GAS, USING A GAS CLEANING AGENT

The present invention relates to a process for the removal of contaminants from a gas, using a gas cleaning agent, which contamination is selected from the group comprising aromatic hydrocarbons and (poly)halogenated aromatic hydrocarbons.

Such a process is known from the German patent publication DE-A-39 39 214. This document describes a process for the removal of acidic substances and organic compounds from a gaseous effluent. The acidic substances mentioned are among others HCl, HF and sulphur dioxide; as organic compounds organic chlorinated hydrocarbons are mentioned such as chlorinated dioxines and furanes, PCBs, polycyclic aromatic hydrocarbons and phenols. Volatile heavy metals such as mercury and cadmium are also mentioned. For the removal of these compounds activated carbon or the like, suspended in lime milk is sprayed into the gas stream by means of a spray device. Practice has shown that this activated carbon may also be brought into contact with the gases directly, in the form of powder (dry) or in suspension.

The most important task of the activated carbon is the absorption of harmful substances. The activated carbon, together with the absorbed harmful substances can then be processed into and/or be stored as chemical waste. This reduces the emission of harmful components via the flue gas into the air.

Activated carbon is used in waste incineration plants in particular for the removal of polyhalogenated hydrocarbons such as PCDDs ("dioxines") and PCDFs ("furanes").

However, there are a few draw-backs attached to the use of activated carbon. The ever more stringent environmental regulations make it more and more difficult to comply with the PCDD/F-chimney emission values by cleaning flue gases using activated carbon.

In addition, a considerable amount of activated carbon is required, with consequently a considerable use of raw material and high costs.

Another draw-back is that the use of large amounts of activated carbon also creates a large stream of residual substances.

Further, the use of activated carbon in suspension causes additional wear of the pumps, washers, nozzles, appendages and the like used in the gas cleaning plant.

Also, the danger aspects are greater (dust explosions) when dry activated carbon is used.

It is the objective of the present invention to avoid these draw-backs. According to the invention this objective is achieved by the addition of a detergent as gas cleaning agent for the removal of the contaminant.

It should be noted that the European patent application EP-A-0 442 079 discloses the use of a non-foaming or weakly foaming agent for the cleaning of gases or waste gases. However, these agents serve for the removal of undesirable components which can be further processed by means of bacterial strains; according to EP-A-0 442 079, therefore, these agents are not suitable for the removal of dioxines, PCBs and the like.

By using a detergent instead of activated carbon as a gas cleaning agent for the removal of a contaminant from a gas, at least the same PCDD/F chimney emission values can be achieved as according to the state of the art, at substantially lower costs and with simple means.

Moreover, fewer chemicals or raw materials will be required, as a result of which fewer residual substances are produced.

It will also avoid the additional wear of the pumps, washers, nozzles, appendages and the like caused by the activated carbon in suspension.

The greater danger aspects ensuing from working with dry activated carbon (dust explosions) are eliminated.

A further advantage of the present invention is that extra maintenance/replacement required when pipes, membranes, pH electrodes and the like become obstructed with activated carbon, is avoided.

The consequence of all this is that the investment and exploitation costs are considerably reduced.

The detergents may be distinguished into roughly four types, namely:

non-ionic R—O—R—O—R
cationic R—$NH_3^+$
anionic R—$SO_2$—$O^-$
zwitterionic $^+H_3N$—R—$SO_2$—$O^-$, with R being the so-called apolar tail, to which fat or water-insoluble organic molecules in general can adhere. Thus by means of the polar portion of the detergent these water-insoluble organic molecules become water-soluble after all.

According to a further characteristic of the present invention, the detergent is selected from a group formed by an anionic detergent, non-ionic detergent and a mixture thereof.

The use of cationic and zwitterionic detergents is not recommended because of these detergent's instability under conditions often prevailing in flue gas cleaning installations. These conditions are often characterized by:

pH=1 to 7
salt concentrations of 10 g $Cl^-$/l 10 g $SO_4^-$/l 10 g $Na^+$/l
a temperature of 50–100° C.

According to the invention it is preferred, therefore, to use non-ionic and anionic detergents or a mixture thereof.

According to the invention the most preferred detergent is an anionic detergent, because compared with non-ionic detergents, anionic detergents are relatively independent of the temperature of application. However, anionic detergents are dependent on the pH and the salinity, because at low pH values and/or high salinity, anionic detergents tend to de-sulphatate (i.e. separate from a sulphate group). This separating from a sulphate group does not necessarily have any adverse effects provided the remaining part is non-ionic.

According to yet another characteristic according to the present invention, the detergent is used in combination with a carrier. This is preferably water, as water is cheap and well miscible with detergents.

According to yet another characteristic according to the present invention the detergent is added continuously. A continuous addition of detergent ensures that the detergent is well able to come into contact with the contaminations in the flue gas.

According to yet another characteristic according to the present invention the detergent is added in an amount low enough to not yet form any foam. Such an amount of detergent ensures that sufficient detergent is present for cleaning the flue gas.

The present invention will now be explained in more detail with reference to an exemplary embodiment.

Flue gas from a waste incineration plant is introduced into a first flue gas cleaner (first washer). The flue gas is subsequently introduced into a second washer, and will then leave the smoke cleaning plant via a chimney. With the aid of a metering pump, the second washer is continuously supplied with detergent instead of activated carbon. The concentration is 5,6 l/24 u, which corresponds to 117 mg/l circulation water from the first washer.

The superfluous circulation water from the second washer is discharged to the first washer.

The detergent is a sodium salt of an ethoxylated and sulphatated tridecylalcohol having a detergent content of 25–50%. The concentration of anionic detergent is >26%, the concentration of non-ionic detergent is 2–4%.

The concentration level of PCDD/F in the circulation water of the first washer is 6.8 ng TEQ/l. The sluice from the first washer is adjusted to 2 m$^3$/h, this means that 6.8×2000=13,600 ng TEQ/h is sluiced out. A flue-gas flow of 134,000 Nm$^3$/h results in a removal of 0.101 ng/Nm$^3$ from the first washer via the sluice. 0.106 ng/Nm$^3$ are emitted via the chimney. Thus the total supply to the first washer was 0.207 ng/Nm$^3$.

Table I shows the TEQ concentration in the supply and discharge of the activated-carbon process and the detergent process.

TABLE I

| Process | introduction in 1$^{st}$ washer ng TEQ/Mn$^3$ | removal via the washers ng TEQ/Nm$^3$ | emission via chimney ng TEQ/Nm$^3$ | ratio of efficiency % |
|---|---|---|---|---|
| activated carbon | 0.14–0,3 | 0.08–0.24 | 0.060 | 57–80 |
| detergent | 0.207 | 0.101 | 0.106 | 49 |

What is claimed is:

1. A process for the removal of contaminants from a gas, using a gas cleaning agent, which contaminant is a (poly) halogenated aromatic hydrocarbon, wherein an anionic detergent is added as the gas cleaning agent for removing the contaminant.

2. A process according to claim 1, wherein the detergent is a mixture of the anionic detergent and a non-ionic detergent.

3. A process according to claim 1, wherein the detergent is used in combination with a carrier.

4. A process according to claim 3, wherein the carrier is water.

5. A process according to claim 1, wherein the anionic detergent is added continuously.

6. A process according to claim 1, wherein the anionic detergent is added in an amount low enough to prevent formation of foam.

* * * * *